(12) United States Patent
Janzen

(10) Patent No.: US 10,080,435 B2
(45) Date of Patent: Sep. 25, 2018

(54) GUIDE DEVICE FOR GUIDING A FURNITURE PART THAT IS MOVEABLE RELATIVE TO A FURNITURE BODY

(71) Applicant: Grass GmbH, Höchst (AT)

(72) Inventor: Jörg Janzen, Lustenau (AT)

(73) Assignee: Grass GmbH, Höchst (AT)

(*) Notice: Subject to any disclaimer, the term of this patent is extended or adjusted under 35 U.S.C. 154(b) by 0 days.

(21) Appl. No.: 15/388,875

(22) Filed: Dec. 22, 2016

(65) Prior Publication Data
US 2017/0172301 A1 Jun. 22, 2017

(30) Foreign Application Priority Data
Dec. 22, 2015 (DE) .................. 20 2015 008 848 U

(51) Int. Cl.
*A47B 88/47* (2017.01)
*E05F 5/00* (2017.01)
(Continued)

(52) U.S. Cl.
CPC .......... *A47B 88/477* (2017.01); *A47B 88/437* (2017.01); *A47B 88/447* (2017.01);
(Continued)

(58) Field of Classification Search
CPC ..... A47B 88/473; A47B 88/477; A47B 88/10; A47B 88/14; A47B 88/437; A47B 88/0466; A47B 88/493; A47B 2210/0037; A47B 2210/004; A47B 2210/0091; A47B 2210/0097; A47B 2210/0032; A47B 2210/0035; A47B 88/40; A47B 88/487
See application file for complete search history.

(56) References Cited

U.S. PATENT DOCUMENTS 6,015,199 A * 1/2000 Netzer .................. A47B 88/493
312/334.46
7,213,896 B2 * 5/2007 Chi ....................... A47B 88/493
312/334.8
(Continued)

FOREIGN PATENT DOCUMENTS

CN 202086024 U * 12/2011 ............. A74B 88/04
CN 103479104 A * 1/2014 ............. A74B 88/10
(Continued)

*Primary Examiner* — Andrew Mark Roersma
(74) *Attorney, Agent, or Firm* — Edell, Shapiro & Finnan, LLC

(57) ABSTRACT

A guide device for guiding a furniture part movable relative to a furniture body comprises: a guide unit including a body rail fixable to the furniture body; a sliding rail connectable to the movable furniture part and displaceably mounted relative to the body rail via a rail guide movable in a sliding direction, wherein the rail guide is mounted displaceably relative to the body rail and the one sliding rail and, when withdrawn to an open position, abuts against stops on the body rail and sliding rail; and a damper to damp the impact of the rail guide on at least one of the stops. The rail guide comprises at least two guide sections arranged behind one another in the sliding direction. The guide sections are connected to one another by a damping section that is flexible in the sliding direction and equipped with the damper.

12 Claims, 2 Drawing Sheets

(51) Int. Cl.
  *F16C 33/38* (2006.01)
  *A47B 88/49* (2017.01)
  *A47B 88/44* (2017.01)
  *A47B 88/43* (2017.01)
  *E05D 15/06* (2006.01)
  *E05F 5/02* (2006.01)
  *E05F 5/08* (2006.01)
  *A47B 88/477* (2017.01)
  *A47B 88/493* (2017.01)
  *A47B 88/447* (2017.01)
  *A47B 88/497* (2017.01)
  *A47B 88/437* (2017.01)

(52) U.S. Cl.
  CPC .......... *A47B 88/493* (2017.01); *A47B 88/497* (2017.01); *E05D 15/0621* (2013.01); *E05F 5/00* (2013.01); *E05F 5/003* (2013.01); *E05F 5/02* (2013.01); *E05F 5/08* (2013.01); *F16C 33/38* (2013.01); *A47B 2210/004* (2013.01); *A47B 2210/0013* (2013.01); *A47B 2210/0097* (2013.01); *E05Y 2900/20* (2013.01)

(56) References Cited

U.S. PATENT DOCUMENTS

| | | | |
|---|---|---|---|
| 8,960,821 B2* | 2/2015 | Breisacher | A47B 88/493 |
| | | | 312/331 |
| 2004/0222723 A1* | 11/2004 | Fitz | A47B 88/467 |
| | | | 312/334.6 |
| 2008/0303395 A1* | 12/2008 | Chen | A47B 88/493 |
| | | | 312/334.8 |
| 2014/0009054 A1* | 1/2014 | Salice | A47B 88/16 |
| | | | 312/334.44 |

FOREIGN PATENT DOCUMENTS

| | | | | |
|---|---|---|---|---|
| DE | 10227881 A1 | | 1/2004 | |
| DE | 102004002823 A1 | * | 8/2005 | ............. A47B 88/10 |
| DE | 202010011854 U1 | * | 11/2011 | ........... A47B 88/493 |
| DE | 202012005007 | | 9/2012 | |
| EP | 1516563 A1 | * | 3/2005 | ............ F16C 33/306 |
| WO | WO 2007028593 A1 | * | 3/2007 | ........... A47B 88/493 |

\* cited by examiner

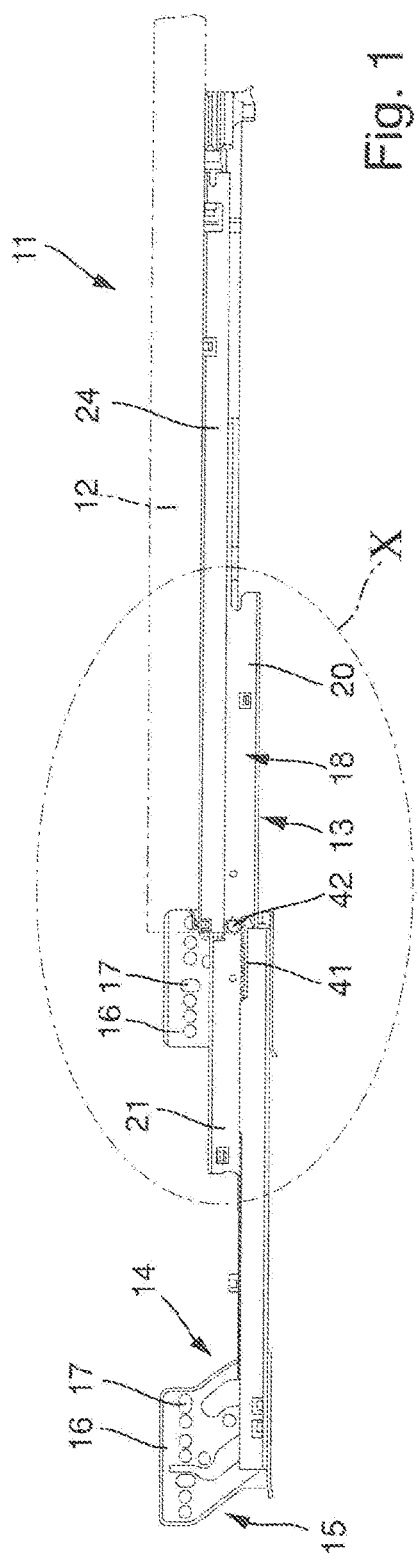
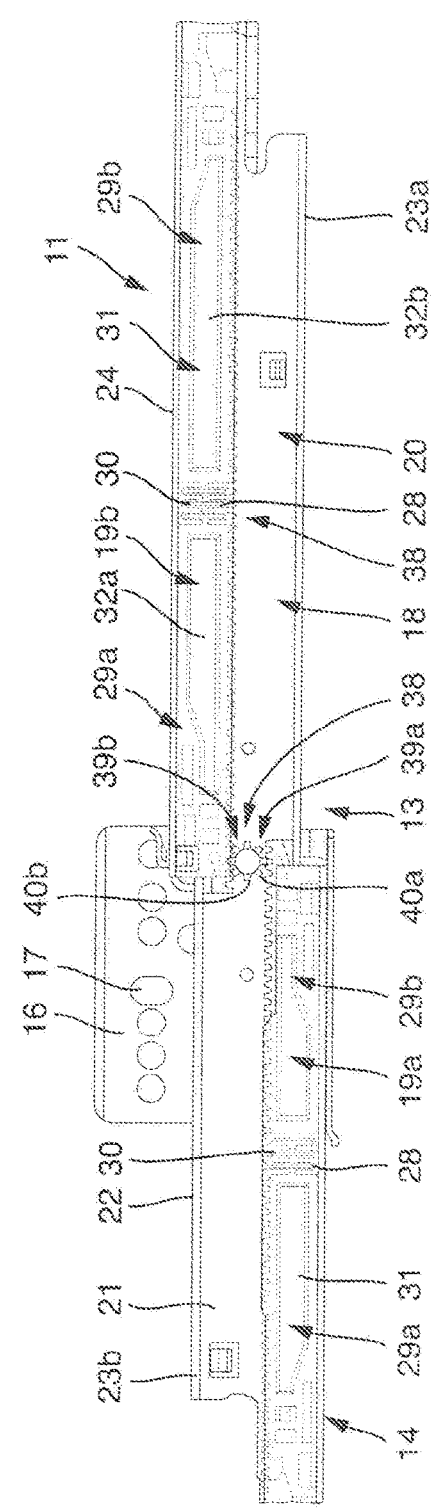

GUIDE DEVICE FOR GUIDING A FURNITURE PART THAT IS MOVEABLE RELATIVE TO A FURNITURE BODY

CROSS REFERENCE TO RELATED APPLICATIONS

This application claims foreign priority under 35 U.S.C. § 119(a)-(d) to German Application No. DE 202015008848.1 filed on Dec. 22, 2015, the entire contents of which are hereby incorporated by reference.

FIELD OF THE INVENTION

The invention relates to a guide device for guiding a furniture part, in particular a drawer, door or flap, movable relative to a furniture body, with at least one guide unit that has a body rail that can be fastened to the furniture body and at least one sliding rail that can be connected to the movable furniture part and is displaceably mounted relative to the body rail via a rail guide movable in a sliding direction, wherein the rail guide is in turn mounted displaceable relative to the body rail and are also mounted displaceable relative to at least one sliding rail, and when withdrawn to an open position they strike on the one hand against a stop on the body rail and on the other hand against a stop on the sliding rail, and with a damper to damp the impact of the rail guide on at least one of the stops.

BACKGROUND

Extension guides for movable furniture parts, in particular drawers, are known from non-demonstrable printed prior art, which are configured as full extensions with body rail, middle rail and drawer rail. The rails are guided movably relative to one another. Roller carriages with castors are inserted between the rails. The rails have metallic end stops in order to prevent an over-withdrawal of the whole guide system and to define an overall extension length. The roller carriages arranged between the rails run onto the end stops of the rails when the furniture part is fully open. In this regard the aim is to dampen the "hard" impact against the end stop. It is already known from non-demonstrable prior art to install a damper, for example in the form of a rubber buffer, on the front side of the roller carriage associated with the end stop. In this way, the impact of the roller carriage against the end stop is damped.

However, with roller carriages provided with such dampers the problem arises that they suffer wear on frequent impact against the end stops, which means that they have to be replaced.

SUMMARY

The object of the invention is therefore to provide a guide device of the type mentioned in the introduction that is less susceptible to wear compared to guide devices of the prior art.

This object is achieved by a guide device having the features of the independent claim 1. Developments of the invention are illustrated in the sub-claims.

The guide device according to the invention is characterized in that the rail guide has at least two guide sections arranged behind one another in the sliding direction, which are connected to one another by a damping section equipped with the damper flexible in the sliding direction.

Compared to the prior art, the damper is therefore remote from the front side and are installed on a region between two guide sections of the rail guide. There is therefore no direct contact of the damper with the end stop and accordingly the wear is reduced.

In a particularly preferred manner, a locking mechanism is provided, which can be brought into a locking position in engagement with the rail guide, in which a blocking of the relative movability of the guide sections relative to one another takes place.

With the aforementioned dampers from the prior art, the rail guides, for example roller carriages, strike against associated end stops also when the rail guide is moved to the closed position. However, the dampers remain active in the closed position, whereby the movable furniture part, in particular the drawer, does not adopt a defined closed position in the closed position since in the region of the damping path of the damper there is a certain flexibility also in the closed position. For example, the user could in the case of a drawer, force it a little way too far in by pressing on the front panel of the drawer. Owing to the locking mechanism, the relative movability of the guide sections relative to one another is however blocked, so that the movable furniture part can adopt a defined closed position independently of the damper.

In a development of the invention the engagement of the locking mechanism with the rail guide takes place on the damping section in order to block its flexibility. Preferably, the locking mechanism thus engages directly in the damper present in the damping section.

In a development of the invention the damper comprises at least one spring element that is mounted on the one hand on one guide section and on the other hand on the other guide section of the rail guide. The spring element can for example be a strip of the material of the guide sections joining these sections to one another, and in particular is multiply coiled and thus has an elastic flexibility. It is however also possible for the spring element to be an element separate from the guide sections, which is fastened on the one hand to one guide section and on the other hand to the other guide section, for example a compression spring, consisting in particular of spring steel.

In a particularly preferred manner the rail guide has a connecting rod for connecting the guide sections, which comprises a first rod section fastened to one guide section and a second rod section fastened to the other guide section, between which is arranged the damping section.

It is possible for the connecting rod to be part of the rail support for supporting the sliding rail on the body rail. In a particularly preferred manner the rail support is formed as a rack/pinion combination, with the connecting rod formed as a rack and at least one pinion in meshing engagement or that can be brought into meshing engagement when the movable furniture part is inserted or pulled out.

In a development of the invention the rack comprises a toothed region with a plurality of teeth arranged behind one another in the sliding direction, which extends over the first rod section, the damping section and the second rod section.

In a particularly preferred manner the damper, in particular the spring element, comprises teeth of the toothed region. The pinion is advantageously part of the locking mechanism.

In a particularly preferred manner the pinion in the locking position engages in the teeth formed in the damping section, in particular on the spring element. Owing to the positive engagement between the pinion and the teeth in the damping section the elastic flexibility of the damper is blocked.

In a development of the invention the rail guide has at least one roller carriage with a carriage housing and castors rotationally mounted thereon.

Preferably two sliding rails are provided, one of which is formed as a middle rail displaceably mounted relative to the body rail via a lower module of the rail guide and the other of which is formed as an extension rail displaceably mounted relative to the middle rail via an upper module of the rail guide.

Advantageously both the upper and lower modules are provided with damping sections.

The invention furthermore comprises an item of furniture with a furniture part movable relative to a furniture body and guided via a guide device, which is characterized by a guide device according to one of claims 1-12.

BRIEF DESCRIPTION OF THE DRAWINGS

Preferred exemplary embodiments of the invention are illustrated n the drawings and are described in more detail hereinafter with the aid of the drawings, in which:

FIG. 1 is a schematic side view of a first exemplary embodiment of the guide device according to the invention in the extended state, FIG. 2 is an enlarged representation of the detail X of FIG. 1.

DETAILED DESCRIPTION

Figure 4:
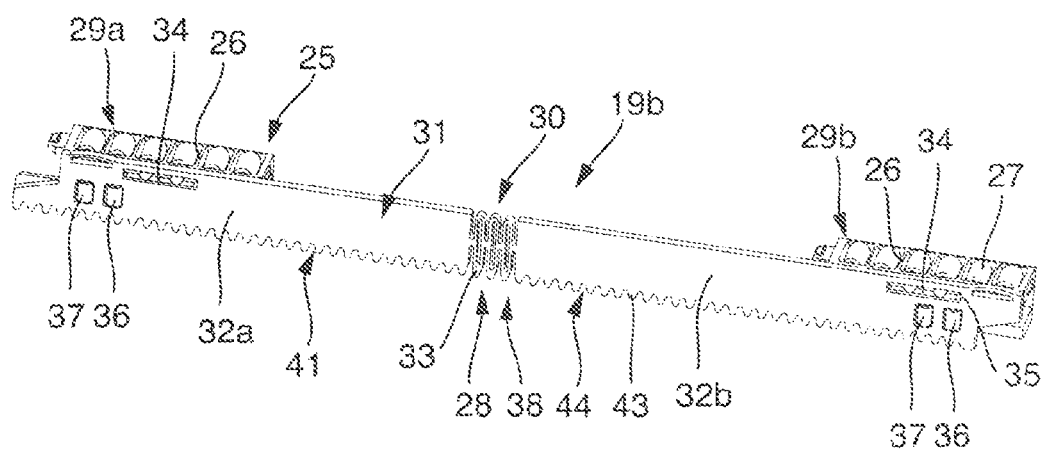
FIG. 4 is a perspective view of the rail guide of the first exemplary embodiment of the guide device according to the invention.

FIGS. 1, 2 and 4 show a first exemplary embodiment of the guide device 11 according to the invention. The guide device 11 is described here by way of example in use on a movable furniture part 12 formed as a drawer. It is naturally possible to use the guide device 11 also on other furniture parts, for example on doors, flaps or the like.

The guide device 11 according to the invention is however explained hereinafter with the example of a drawer. The drawer is displaceably mounted relative to a furniture body (not shown) via the guide device 11. The guide device 11 includes at least one guide unit 13, in particular two guide units 13, which are arranged on oppositely facing side edges of the drawer. In the drawing only a single guide unit 13 is illustrated, though the other guide unit associated with the opposite side edge of the drawer is constructed in an identical manner.

The guide units 13 have respectively a body rail 14, which could be formed for example as a bent sheet metal part. The body rail 14 comprises a bracket 15, which has at least one installation arm 16 that includes a plurality of fastening holes 17 arranged behind one another for example in rows, by which the bracket 15 can be securely fastened with the aid of a suitable fastener to an associated side wall of a drawer holder formed in the furniture body. The bracket 15 has a bearing section projecting at an angle from the installation arm 16, on which a middle rail 18 also belonging to the guide unit 13 is displaceably guided in a manner to be described hereinafter.

As is shown in particular in FIG. 2, the middle rail 18 is displaceably mounted relative to the body rail 14 via a lower module of a rail guide 19a. Advantageously the middle rail 18 is likewise configured as a sheet metal profile, in particular with a U-shaped cross-section. The middle rail 18 has for this purpose a base section 20 vertically aligned in the installed state of the guide device 11, which comprises a flat two-dimensional front side 21 and a flat rear side 22 opposite this and aligned with the installation arm 16 of the bracket 15. Two arm sections 23a, 23b running substantially parallel to one another are formed on the base section 20, which sections respectively extend in the region of the rear side 22 of the base section 20.

The upper and lower sides of the arm sections 23a, 23b form sliding surfaces for the lower module of the rail guide 19a and also for an upper module of the rail guide 19b, wherein the middle rail 18 is mounted in a linear displaceable manner via the latter on an extension rail 24.

As is shown in particular in FIG. 4, the upper module of the rail guide 19b has at least one roller carriage 25, which has a carriage housing 26 that is associated with the upper arm section 23b. The carriage housing 26 is advantageously formed of a plastic material. The carriage housing 26 extends along the upper arm section 23b. A plurality of castors 27 are accommodated n the carriage housing and are rotationally mounted there by a suitable bearing. The castors 27 are advantageously grouped in several groups of castors each containing respectively several castors 27. The rotation axes of the castors 27 extend in the plane of the associated upper arm section 23b. Each group of castors has a plurality of upper castors and a plurality of lower castors 27. The upper castors 27 of a group of castors are arranged behind one another in the longitudinal direction, their rotation axes being aligned parallel to one another. The upper castors of a group of castors extend with their sliding surfaces on the upper side of the associated upper arm region 23b. The lower castors 27 of a group of castors are arranged opposite to the upper castors 27 of the same group of castors, and specifically such that an upper castor 27 always lies paired with an opposite lower castor 27, wherein the associated upper arm section 23b is accommodated between the upper and lower castors 27. The lower castors 27 of a group of castors run with their sliding surfaces on the lower side of the associated upper arm section 23b of the middle rail 18. Also the lower module of the rail guide 19a has at least one roller carriage, which is formed substantially identically to the previously described roller carriage of the upper module of the carriage guide 19b. Here too upper castors 27 and lower castors 27 are provided, wherein the upper castors 27 run on the upper side of the lower arm section 23a and the lower castors run on the lower side of the lower arm section 23a.

The extension rail 24, which in the example here could also be described as a drawer rail, is coupled via a coupler, in particular via a catch, to the drawer.

The lower module of the rail guide 19a is mounted relatively displaceable with respect to the body rail 14 and also relatively displaceable with respect to the middle rail 18. The upper module of the rail guide 19b is mounted on the other hand displaceable relative to the middle rail 18 and also displaceable relative to the extension rail 24.

The lower module of the rail guide 19a when the drawer is pulled out to the open position strikes on the one hand a stop (not illustrated) on the middle rail 18 and on the other hand on a stop on the body rail 14. The upper module of the rail guide 19b on the other hand when the drawer is pulled out to the open position strikes on the one hand a stop on the middle rail 18 and on the other hand a stop on the extension rail 24. In this connection the front side of the roller carriage 25 of the lower module of the rail guide 19a hits the stops on the body rail and on the middle rail 18, whereby simultaneously the roller carriage 25 of the upper module of the rail guide 19b hits the stops on the middle rail and on the extension rail 24.

In order to avoid a hard impact of the roller carriage 25 against the stops on the rails, the guide device 11 has a damper 28 to damp the impact of the rail guide, i.e., the impact of the roller carriages 25 on at least one of the stops.

The rail guide, i.e., the lower module of the rail guide 19a and also the upper module of the rail guide 19b, have respectively at least two guide sections 29a, 29b arranged behind one another in the sliding direction, which are connected to one another by a damping section 30 flexible in the sliding direction and equipped with the damper 28.

As illustrated in particular in FIG. 4, the two guide sections 29a, 29b of the upper module of the rail guide 19b are formed by carriage parts of the roller carriage 25 arranged behind one another in the sliding direction. The carriage parts have respectively a carriage housing 26, in which respectively a group of castors consisting of a plurality of upper and lower castors 27 is accommodated in the manner described hereinbefore.

As is illustrated in particular in FIG. 4, the two guide sections 29a, 29b, i.e., the two carriage parts of the roller carriage 25 of the upper module of the rail guide 19b shown in the example case, are connected to one another by a connecting rod 31. The connecting rod 31 has a first rod section 32 fastened to the first guide section 29b and a second rod section 32b fastened to the second guide section 29b.

As is further illustrated in FIG. 4, the damping section 30 with the damper 28 is arranged in the sliding direction between the two rod sections 32a, 32b.

The damper 28 includes in the illustrated example case at least one spring element 33, which is fastened on the one hand to one guide section 29a, 29b and on the other hand to the other guide section 29a, 29b, in particular to the one rod section 32a and on the other hand to the other rod section 32b. The two rod sections 32a, 32b are thus mounted flexibly with respect to one another via the spring element 33, whereby also due to the coupling to the associated guide sections 29a, b these are also mounted flexibly, in particular resiliently, with respect to one another.

The connecting rod 31 is formed in the illustrated example case of plastic material. In the illustrated example the spring element 33 is also formed of the material of the connecting rod 31. The spring element 33 is formed in the illustrated example by a narrow, wound material strip, which is formed on the one hand on the first rod section 32a ad on the other hand on the second rod section 32b. It is possible that a spring element 33 shaped in such a way is formed at the same time as the production of the connecting rod 31.

As is illustrated in particular in FIG. 4, the connecting rod 31 is fastened to the longitudinal sides of the carriage parts associated with the front side 21 of the middle rail. To fasten the connecting rod 31 the first guide section 29a and the first carriage part have a forwardly directed connection piece 34 projecting from the longitudinal side. A connection piece 34 is also formed in an identical manner on the rear or second guide section 29b or second carriage part. On the connecting rod 31 a slit-shaped recess 35, which is also reproduced on the second rod section 32b, is located corresponding to the connection pieces 34 on the first rod section 32a. The connecting rod 34 can therefore be fastened in a simple manner to the guide sections 29a, b and carriage parts, in which the slit-shaped recesses 35 can be clipped onto the associated connection pieces 34. Such a fastening without the use of tools can be carried out easily and quickly. The replacement of connecting rods, for example in the case of wear or damage, can therefore also be carried out in a simple manner.

The connecting rod 31 and the two rod sections 32a, 32b have respectively also a number of window-shaped openings 36 through which project supporting rollers 37, which are arranged on the side wall of the carriage parts and guide section 29a, 29b.

The guide device 11 furthermore has a locking mechanism 38, which can be brought into a locking position in engagement with the rail guides 19a, 19b, in which a blocking of the relative movement of the guide section 29a, 29b with respect to one another takes place.

The connecting rod 31 is part of the rail support 39 for supporting the extension rail 24 on the middle rail and for supporting the middle rail 18 on the body rail 14.

In the illustrated example lower rail support 39a is associated with the lower module of the rail guide 19a and upper rail support 39b is associated with the upper module of the rail guide 19b. The rail guides 39a, 39b are respectively formed as a rack/pinion combination 40a, 40b. The lower rack/pinion combination 40a is formed by a rack 41 formed on the connecting rod 31 of the lower module of the rail guide 19a and by a pinion 42 rotationally mounted on the middle rail 18. The upper rack/pinion combination 40b is on the other hand formed by a rack 41 formed on the upper module of the rail guide 19b and the pinion 42 rotationally mounted on the middle rail. The pinion 42 on the middle rail thus meshes with the rack 41 on the connecting rod 33 of the upper module of the rail guide 19b and also with the rack 41 on the connecting rod 31 of the lower module of the rail guide 19b.

The racks 41 on the upper and lower modules of the rail guides 19a, 19b are formed identically.

The rack 41 has a toothed region 44 provided with a plurality of teeth 43 arranged behind one another in the sliding direction, the toothed region extending over the first rod section 32a, the damping section 30 and the second rod section 32b.

As is illustrated in particular in FIG. 4, the spring element 33 arranged between the two rod sections 32a, 32b therefore also comprises teeth 43 of the toothed region 44.

The pinion 42 is part of the locking mechanism 38, wherein in the locking position the pinion engages in teeth 43 formed on the spring element 33 in the damping section 30 and thus blocks the flexibility of the two rod sections 32a, 32b with respect to one another, since the teeth of the pinion 42 engage in the tooth interstices of the toothed region 44 of the spring element 33 and the teeth 43 on the spring element 33 engage in the interstices between the teeth on the pinion, whereby the two rod sections 32a, 32b are prevented from being pressed together or forced apart.

Figure 3:
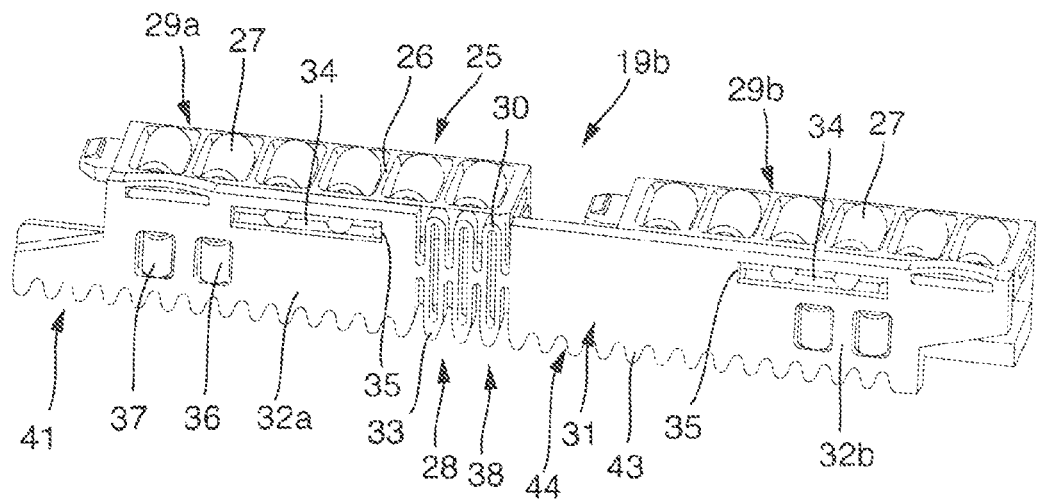
FIG. 3 is a perspective representation of a second exemplary embodiment of the guide device according to the invention, in which a variant of the rail guide is illustrated in a perspective view.

FIG. 3 shows a second exemplary embodiment of the guide device 11 according to the invention. The second exemplary embodiment of the guide device 11 differs from the previously described first exemplary embodiment simply in that the connecting rod 31 is formed shorter than in the first exemplary embodiment and therefore the interspacing of the two carriage parts and guide section 29a, 29b is shorter relative to one another in the sliding direction. The second exemplary embodiment therefore illustrates a somewhat more compact structure of the guide device 11. The mode of operation, in particular during damping the impact of the roller carriage 25, is the same as in the previously described first exemplary embodiment.

When pulling out the drawer the user removes the drawer from the drawer compartment. Therefore the middle rail 18 and also the extension rail 14 are detached from the body rail 14. Furthermore the extension rail 24 is detached from the middle rail 18. The lower module of the rail guide 19*a* and the upper module of the rail guide 19*b* move apart from one another. If the drawer is completely extended, i.e., is pulled out to the open position, then the roller carriage 25 of the lower module of the rail guide 19*a* hits a stop on the body rail 14 and a stop on the middle rail 18. At the same time the roller carriage 25 of the upper module of the rail guide 19*a* hits a stop on the middle rail 18 and a stop on the extension rail 24. Accordingly the front side of the first guide section 29*a* hits the stop on the middle rail 18 or on the extension rail 24, and the second guide section 29*b* or the second carriage part hits the other of the two stops, i.e., on the extension rail 24 or on the middle rail 18. Since the damping section 30 with the spring element 33 is arranged between the two carriage parts or guide sections 29*a*, 29*b*, the impact is damped, since there is an elastic flexibility between the two carriage parts.

When the drawer is moved inwardly to the closed position, the two modules of the rail guides 19*a*, 19*b* move towards one another. In the closed position of the drawer the pinion 42 engages in the teeth 43 of the spring element 33 of the upper connecting rod 31 and also in the teeth 43 of the spring element 33 of the lower connecting rod 31 and thus block the flexibility of the guide sections 29*a*, 29*b* with respect to one another. In this way a defined closed position of the drawer is achieved.

What is claimed is:

1. A guide device for guiding a furniture part moveable relative to a furniture body, comprising:
   at least one guide unit including a body rail fixable to the furniture body;
   at least one sliding rail connectable to the moveable furniture part and displaceably mounted relative to the body rail via a rail guide moveable in a sliding direction, wherein the rail guide is mounted displaceably relative to the body rail and relative to the at least one sliding rail, wherein, in a withdrawn, open position, the rail guide abuts against a stop on the body rail and against a stop on the sliding rail;
   a locking mechanism; and
   a damper to damp the impact of the rail guide on at least one of the stops, wherein:
   the rail guide comprises: at least two guide sections arranged behind one another in the sliding direction; a connecting rod to connect the guide sections, the connecting rod comprising a first rod section fastened to one of the guide sections and a second rod section fastened to another of the guide sections; and a damping section arranged between the first and second rod sections, the damping section being flexible in the sliding direction and equipped with the damper;
   the locking mechanism is arranged to be brought into engagement with the rail guide into a locking position in which relative movement between the guide sections is blocked;
   the connecting rod is part of a rail support to support the sliding rail on the body rail, wherein the rail support comprises a combination of a rack and at least one pinion, with the connecting rod being the rack and with the at least one pinion meshingly engageable with the connecting rod when the furniture part is inserted or pulled out; and
   the at least one pinion is part of the locking mechanism.

2. The guide device of claim 1, wherein the locking mechanism engages the rail guide at the damper to block the flexibility of the damper.

3. The guide device of claim 1, wherein the damper comprises at least one spring element mounted on the guide sections of the rail guide.

4. The guide device of claim 1, wherein the at least one pinion in the locking position engages the teeth of the spring element.

5. The guide device of claim 1, wherein the rail guide comprises at least one roller carriage with a carriage housing and castors rotationally mounted thereon.

6. The guide device of claim 1, wherein the at least one sliding rail comprises a middle rail displaceably mounted relative to the body rail via a lower module of the rail guide, and an extension rail displaceably mounted relative to the middle rail via an upper module of the rail guide.

7. The guide device of claim 6, wherein both the upper and lower modules of the rail guide are equipped with damping sections.

8. The guide device of claim 1, wherein the furniture part is a drawer, door, or flap.

9. An item of furniture, comprising:
   the guide device of claim 1;
   a furniture body; and
   a furniture part moveably guided relative to the furniture body via the guide device.

10. A guide device for guiding a furniture part moveable relative to a furniture body, comprising:
   at least one guide unit including a body rail fixable to the furniture body;
   at least one sliding rail connectable to the moveable furniture part and displaceably mounted relative to the body rail via a rail guide moveable in a sliding direction, wherein the rail guide is mounted displaceably relative to the body rail and relative to the at least one sliding rail, wherein, in a withdrawn, open position, the rail guide abuts against a stop on the body rail and against a stop on the sliding rail;
   a locking mechanism; and
   a damper to damp the impact of the rail guide on at least one of the stops, wherein:
   the rail guide comprises: at least two guide sections arranged behind one another in the sliding direction; a connecting rod to connect the guide sections, the connecting rod comprising a first rod section fastened to one of the guide sections and a second rod section fastened to another of the guide sections; and a damping section arranged between the first and second rod sections, the damping section being flexible in the sliding direction and equipped with the damper;
   the locking mechanism is arranged to be brought into engagement with the rail guide into a locking position in which relative movement between the guide sections is blocked;
   the connecting rod is part of a rail support to support the sliding rail on the body rail, wherein the rail support comprises a combination of a rack and at least one pinion, with the connecting rod being the rack and with the at least one pinion meshingly engageable with the connecting rod when the furniture part is inserted or pulled out; and the rack has a toothed region with a plurality of teeth arranged behind one another in the sliding direction, the toothed region extending over the first rod section, the damping section, and the second rod section.

11. The guide device of claim 10, wherein the damper comprises a spring element having the teeth of the toothed region.

12. The guide device of claim 10, wherein the at least one pinion is part of the locking mechanism.

* * * * *